Figure 1:
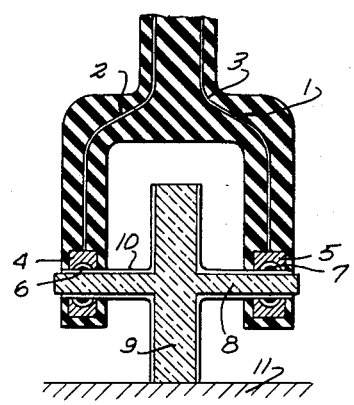

Nov. 22, 1955          P. RENAUT          2,724,783

ROTATIVE PROBE FOR ULTRA SONIC DETECTING DEVICES

Filed March 5, 1954

INVENTOR:
Paul Renaut
BY:
Michael S. Striker
agt.

United States Patent Office 2,724,783
Patented Nov. 22, 1955

2,724,783

ROTATIVE PROBE FOR ULTRASONIC DETECTING DEVICES

Paul Renaut, Saint-Maur, France, assignor to Societe a responsabilite limitee Realisations Ultrasoniques, a corporation of France Application March 5, 1954, Serial No. 414,446

Claims priority, application France March 27, 1953

4 Claims. (Cl. 310—8.7)

The invention relates to probes used in ultra-sonic devices for exploration and inspection of pieces, and more specifically of metallic pieces.

It is known to use probes comprising one detecting part, such as, for instance, a piezoelectric crystal or a ceramic, said part transmitting and (or) receiving ultra-sounds across the inspected piece.

In such devices, it is necessary to move the transducer all over the surface of the inspected piece or material, when pieces with a comparatively large surface or continuously rolling material are to be probed. Therefore it can be easily understood that continuous probing at the output of a rolling-mill, cannot be effected with the above mentioned normal type of probe, because of friction due to high speeds of rolling.

Such friction prevents correct continuous working of the probe, even if the latter is immersed in oil. If the probe is alternately removed and applied in various places of the piece or rolling material, an intermittent inspection is obtained.

It is an object of the invention to eliminate these inconveniences, providing for a probe which can be easily moved on the surface of the inspected piece.

The probe, object of the invention, is characterized in that the part of the probe in contact with the inspected piece and transmitting ultra-sounds to said piece is in the form of a body of revolution around an axis or a point, said axis or point being in a fixed position with reference to the probe.

When the probe is moved on the inspected piece, said contact part rolls on the piece around said axis or said point and therefore friction is reduced to a minimum value.

In the case of a body of revolution around an axis, said contact part, for transmitting ultra-sounds to the inspected piece, is supported on the surface of said piece, along one of the generants of said body of revolution. In the case of a body of revolution around a point, a spherical body for instance, the portion of contact is approximately reduced to a point.

The contact part may either constitute by itself the detecting part of the probe, being then for instance made of a ceramic material, or any other equivalent piezoelectric material, or is only used as means for transmitting ultra-sounds from the generating detecting element to the inspected piece by which it is supported.

In the latter case, the detecting part is preferably either diametrically opposed to the inspected piece, in reference to the axis or point of symmetry of the contact part, the latter being then excavated, and ultra-sounds being transmitted across its wall.

A film of oil may be in any known manner, inserted between the contact part and the explored piece, in order to improve the contact and facilitate transmission of ultra-sounds. The rolling movement does not repel said oil film back as a rubbing movement should do and resulting measurements are greatly improved.

The accompanying drawings illustrate embodiments of the invention. Figure 1 is a vertical section of a probe according to the invention.

Figure 2:
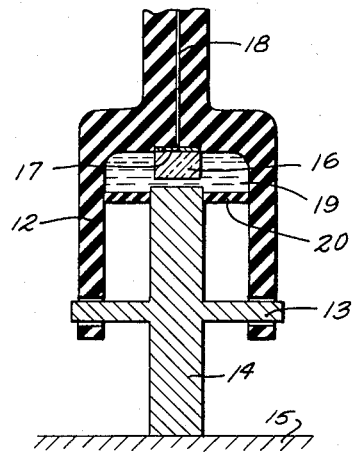
Figure 3:
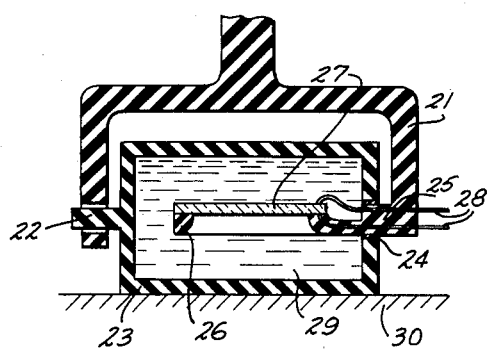
Figure 4:
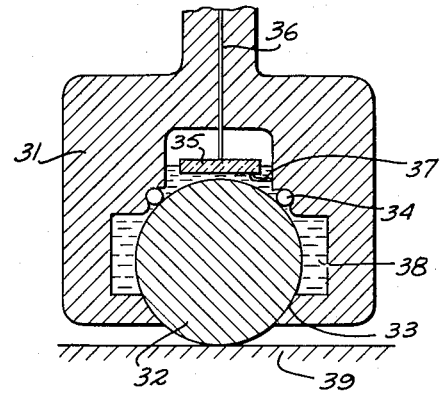

Figures 2, 3 and 4 are similar views corresponding to other embodiments of the invention.

The probe shown on Fig. 1 consists essentially of a supporting frame 1 made of insulating material in which are embedded two electric conductors 2, 3, leading to contact rings 4, 5 suitably shaped for holding mercury in, by capillarity effect, as shown in 6, 7.

Said rings 4, 5, and bored neighbouring parts of the frame 1, constitute the plummer parts of the axis 8 on which is fixed an approximately cylindrical body made of a ceramic material.

A metallization 10 is applied on the axis 8 and both faces of the cylindrical body 9; the latter acts as the detecting part of the probe, and is fed with electric current through the conductors 2, 3, the rings 4, 5, the mercury in 6, 7, the metallization 10, and, finally, through the cylindrical body 9, which has an electromechanical revolution axis.

During the inspection of piece 11, the cylindrical body 9 is rolling along the surface of said piece, thus providing for a continuous exploration, the ultra-sounds being transmitted through its generants successively in contact with the explored piece.

In another embodiment shown in Fig. 2, the supporting frame 12 of the probe supports an axis, the axle of a contact cylindrical body 14, made of a good conductive but non-piezoelectric material transmitting ultra-sounds, said cylindrical body rolling, during exploration, along the surface of the piece 15. The detecting part is, in this case, constituted by a crystal 16 lodged in an excavation in the hollow part of the frame, and supporting electrodes 17 electrically fed through a conductor 18. The above mentioned parts are disposed in such a way that a thin oil film is permanently interposed, as shown in 19, between said crystal 16 and the contact cylindrical body 19, in order to eliminate friction. A flexible and tight joint holds the oil film in the cavity between said joint and the bottom of the hollow part of the frame.

It may be seen that the detecting part 16 is, in this case, diametrically opposed to the piece 15 in reference to the axis 13, which provides for an optimum transmission of ultra-sounds through the cylindrical body 14.

The probe shown of Fig. 3 comprises a supporting frame 21, made of an insulating material, a branch of it being bored so as to constitute a plummer-block for an axle 22 forming one part with a hollow cylinder of contact 23 made of a non-piezoelectric material. The opposite end of the cylinder of contact 23 is provided with a hole through which passes the axle 25 joined together with the frame 21, said cylinder and said axle being jointed by means of a tight joint 24. Said axle is extended inside the cavity of the hollow cylinder 23 by a ring-shaped support 26 on which lies the crystal 27 which constitutes the detecting part of the probe. Said crystal is provided with electrodes (not shown), leading to conductors 28 passing through the axle 25. The cylinder 23 is filled with oil as shown in 29. During the inspection of the piece, the cylinder 23 is rolling along the surface of the piece 30 with which it is permanently in contact along one of its generants. Ultra-sounds are transmitted to said piece, from the detecting part 27, through the oil 30 and the wall of the cylinder 23.

In another embodiment, shown in Fig. 4, the support 31 of the probe, preferably made of a conductive material, is excavated for lodging a sphere of contact 32, held in the frame 31 thanks to a specific shape of the grasping lips 33 of said frame, said sphere rolling inside the frame 31 in ball bearings 34.

The detecting element consists of a crystal 35 provided with electrodes electrically fed by a conductor 36 out of its faces whereas another conductor 37 leads from its opposite face to the conductive support 31. The inward cavity of the frame is filled with oil as shown in 38. During the inspection of the piece, the sphere of contact 32 is rolling along the surface of the piece 39, and ultra-sounds are transmitted, from the detecting piece 35, through the oil 38 and said sphere 32, said detecting piece being as in the above description, diametrically opposed to the piece 39 in reference to the center of the sphere of contact 32.

It may be noted that, in every one of the above described embodiments, the contact of the probe with the inspected piece is continuously maintained during all the time of the exploration, and that said contact is obtained with every point of the surface of the piece, thanks to the rolling of the probe, and therefore, without any noticeable friction.

What is claimed is:

1. A transducer for elastic waves, consisting essentially of a support, a ceramic vibratile piezo-electric element in the form of a body of revolution mounted rotatably within said support, whereby said ceramic piezo-electric element can roll over the surface of the inspected material or work.

2. A transducer according to claim 1, wherein said support is an insulating frame provided with plummer blocks and said vibratile rotatable ceramic element in contact with the inspected material or work is a full cylindrical roller having an axle supported in said plummer blocks.

3. A transducer according to claim 2, wherein said cylindrical ceramic roller has two opposite ends each having a metallization which constitutes an electrode of the piezo-electric element, said transducer further comprising electric conductors embedded in said insulating frame, contact rings located in said plummer blocks and connecting said metallizations to said electric conductors.

4. A probe for ultra-sonic inspection of materials, including a piezoelectric transducer comprising an insulating frame; terminals for connection to electrical transmitting and receiving units; and a contact part to be applied to the surface of the material to be inspected for transmitting probing ultra-sounds to said material, said contact part consisting essentially of a cylindrical roller made of a piezo-electric material and including an axle and metallized walls, said axle being supported on bearings in said insulating frame, and said metallized walls being connected to said terminals.

References Cited in the file of this patent

UNITED STATES PATENTS

| | | |
|---|---|---|
| 2,224,891 | Wright | Dec. 17, 1940 |
| 2,545,101 | Meunier | Mar. 13, 1951 |
| 2,602,327 | Bond | July 8, 1952 |
| 2,618,698 | Janssen | Nov. 18, 1952 |